United States Patent Office 3,132,139
Patented May 5, 1964

3,132,139
PROCESS FOR THE PREPARATION OF SULFONAMIDES OF THE PYRIMIDINE TYPE
Hermann Bretschneider, Innsbruck-Arzl, and Wilhelm Klötzer and Joachim Schantl, Innsbruck, Austria, assignors to Hoffmann-La Roche Inc., Nutley, N.J., a corporation of New Jersey
No Drawing. Filed June 8, 1962, Ser. No. 200,925
Claims priority, application Switzerland June 16, 1961
2 Claims. (Cl. 260—239.75)

The present invention relates to a novel process for the preparation of sulfonamides of the formula

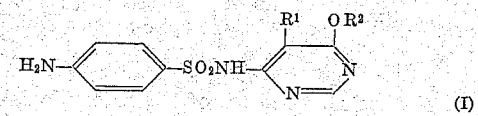

wherein $R^1$ and $R^2$ are lower alkyl groups, preferably those with 1 to 6 carbon atoms, e.g. methyl, ethyl, propyl, isopropyl, butyl, hexyl, etc.; and $R^1$ can also be a hydrogen atom or an —$OR^2$ group.

The present process is carried out by removing the —$SR^2$ group by hydrogenation from a compound having the formula

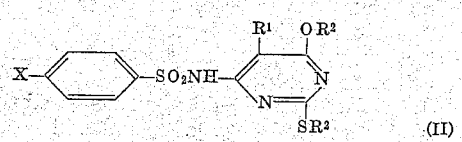

wherein $R^1$ and $R^2$ have the same meaning as in Formula I above, and X is an amino group or an amino group precursor, e.g. acylamino, especially loweralkanoylamino such as acetylamino; carbalkoxyamino, especially lower carbalkoxyamino, such as carbethoxyamino, and carbobenzyloxyamino, etc.; or a nitro group.

When X is an amino group precursor, the reaction product is converted into an amino group by known methods, for example, hydrolysis or reduction. The reduction of reducible groups, such as the nitro group, can also be carried out simultaneously with the hydrogenolysis of the —$SR^2$ group. For splitting off of $N_4$-acyl groups that may be present, such as the $N_4$-acetyl group, the desulfurized reaction product obtained after the hydrogenolysis step need not be isolated. It can be submitted direct to saponification, e.g. by means of sodium hydroxide solution.

According to a preferred process, an alkylthio pyrimidine of Formula II is heated in an aqueous sodium carbonate or ammonia solution in the presence of Raney nickel impregnated with hydrogen at the boiling point of the solution. The —$SR^2$ group is thereby split off. An $N_4$-acylated product is converted into a compound of Formula I containing a free amino group by saponification, e.g. by the addition of an alkali hydroxide, e.g. sodium hydroxide, to the reaction solution. The compound of Formula I can easily be recovered from the alkaline solution by the addition of an acid, for example, acetic acid, until the solution reaches a pH of about 5; or by introducing carbon dioxide to precipitate the product.

The compounds of Formula II which are used as starting materials in the process of the invention can be prepared by coupling an amino pyrimidine of the formula

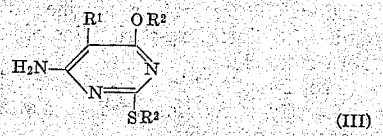

wherein $R^1$ and $R^2$ have the above meaning with a benzenesulfonyl halide which contains an amino group precursor in the para-position, i.e. the amino group precursors defined above for compounds of Formula II.

Starting materials with a free amino group in the p-position can be prepared from the coupled products according to known methods for converting an amino group precursor into an amino group. For example, 2-methylthio-4-amino-6-methoxy-pyrimidine can be reacted with p-acetamidobenzenesulfonyl chloride in pyridine at about room temperature to form 2-methylthio-4-($N_4$-acetylsulfanilamido)-6-methoxy-pyrimidine in good yield. The $N_4$-acetyl group on this compound can be readily split off, e.g. with methanolic HCl, whereupon the 2-methylthio-4-sulfanilamido-6-methoxy-pyrimidine is obtained.

The compounds of Formula I prepared according to the process of the invention exhibit high antibacterial activity, e.g. against staphylococcal, pneumococcal, or Coli bacilli infections; and are useful as antibacterial agents for the treatment of such infections.

The products of the instant process are soluble in strong acids such as sulfuric acid, hydrochloric acid, etc., and in alkalis, e.g. alkali hydroxide, alkali carbonates, or alkali bicarbonate solutions with salt formation.

*Example 1*

8 g. of 2-methylthio-4-($N_4$-acetylsulfanilamido)-6-methoxy-pyrimidine were added to 150 ml. of water in 2.5 g. of anhydrous sodium carbonate. Then about 20 to about 25 g. of Raney nickel [prepared according to Organic Synthesis 21, 15 (1941)] is added thereto and the mixture heated at the boiling point for three hours. The mixture is cooled, 7 g. of sodium hydroxide added, and the reaction product saponified by keeping the reaction mixture on a boiling water bath for 110 minutes. It is then filtered hot, and the Raney nickel washed with two portions of 10 ml. each of hot water. The filtrate is made alkaline with sodium carbonate, and the mixture allowed to stand for one hour in the cold. Upon neutralization with glacial acetic acid, the filtrate yields 5.6 g. of 4-sulfanilamido-6-methoxy-pyrimidine of melting point 190–202° (92% of theory). After several recrystallizations from 50% ethanol, the melting point rises to 205–206° C.

The 2-methylthio-4-($N_4$-acetylsulfanilamido)-6-methoxy-pyrimidine used as the starting material can be prepared as follows:

2.4 g. of 2-methylthio-4-amino-6-methoxy-pyrimidine are dissolved in 15 ml. of pyridine and 3.5 g. of p-acetylamidobenzenesulfonyl chloride added at 20° C. The mixture becomes colored red-brown in a slightly exothermic reaction. After 24 hours at 20° C., the pyridine is evaporated off at a maximum temperatureof 60° C. and the residue triturated with 50 ml. of water. The crystals so obtained are dissolved in 100 ml. of 90% ethanol, the solution filtered and the filtrate added to 200 ml. of hot water. After cooling, 2-methylthio-4-($N_4$-acetylsulfanilamido)-6-methoxy-pyrimidine of melting point 228–231° C. is obtained.

The 2-methylthio-4-amino-6-methoxy-pyrimidine in turn can be prepared from 2-methylthio-4-amino-6-hydroxy-pyrimidine through methylation of the hydroxy group by means of phenyltrimethylammonium chloride, or from 2,6-dichloro-4-amino-pyrimidine by first converting it into 2-methylthio-4-amino-6-chloro-pyrimidine followed by methanolysis of the 6-chlorine atom.

The 2-methylthio-4-sulfanilamido-6-methoxy-pyrimidine used as the starting material for the desulfurization reaction of the invention can be prepared from its $N_4$-acetyl derivative as follows:

1.8 g. of anhydrous 2-methylthio-4-($N_4$-acetylsulfanilamido)-6-methoxy-pyrimidine is suspended in 15 ml. of absolute methanol and 0.4 g. of HCl in 1.5 ml. of absolute methanol added thereto. The mixture is heated under reflux for one hour with exclusion of moisture. The solvent is removed under vacuum, and the residue digested with 12 ml. of 2 N hydrochloric acid, whereupon almost all of the solids go into solution. After standing for one hour at 0°, the solution is filtered, made alkaline with sodium carbonate, and filtered again after standing for thirty minutes at 0° C. The filtrate is neutralized with $CO_2$ until the mother liquor is clear. 1.3 g. of 2-methylthio-4-sulfanilamido - 6 - methoxy-pyrimidine of melting point 170–175° C. (76% of theory) is obtained thereby. After recrystallization from 50% alcohol, the melting point is 176–178° C.

Example 2

10 g. of 2-methylthio-4-($N_4$-acetylsulfanilamido)-5-ethyl-6-methoxy-pyrimidine is heated with 80 ml. of water, 5 ml. of concentrated ammonia, 20 g. of Raney nickel [prepared according to Organic Synthesis 21, 15 (1941)], and 2 ml. of xylene for ¾ hour and then filtered hot. To the hot solution 8 g. of sodium hydroxide is added and the mixture heated to 85–90° for one hour on a steam bath. The mixture is treated with charcoal, filtered, and the alkaline filtrate acidified to pH 5 with acetic acid. Practically pure crystalline 4-sulfanilamido-5-ethyl-6-methoxy-pyrimidine is obtained thereby; melting point 186–187° C. (from acetonitrile).

The 2-methylthio-4-($N_4$-acetylsulfanilamido)-5-ethyl-6-methoxy-pyrimidine used as the starting material can be obtained as follows:

56 g. of p-acetoamidobenzenesulfonyl chloride is added to 44 g. of 2-methylthio-4-amino-5-ethyl-6-methoxy-pyrimidine in 240 ml. of absolute pyridine at 25° C., and the mixture stirred for 24 hours at this temperature. After the addition of 100 ml. of water, the pyridine is almost completely removed by distillation under vacuum, the residue triturated with 350 ml. of water, and the crystals filtered off. 68 g. of 2-methylthio-4-($N_4$-acetylsulfanilamido)-5-ethyl-6-methoxy-pyrimidine of melting point 256–260° is obtained thereby. After recrystallization from acetonitrile, the melting point is 259–260° C.

2-methylthio-4-amino-5-ethyl - 6 - methoxy-pyrimidine can in turn be prepared as follows:

Ethylcyanoacetic acid ethyl ester is condensed with thiourea to form 2-thio-4-amino-5-ethyl-6-hydroxy-pyrimidine (melting point 299–301° C. from ethanol), which is methylated on the mercapto group with dimethyl sulfate, and the 2-methylthio-4-amino-5-ethyl-6-hydroxy-pyrimidine (melting point 221–222° C. from dioxane) obtained thereby is converted to 2-methylthio-4-amino-5-ethyl-6-methoxy-pyrimidine (melting point 102–104° C. from butyl oxide) by means of phenyltrimethylammonium chloride.

Example 3

8.6 g. of 2-methylthio-4-sulfanilamido-5-ethyl-6-methoxy-pyrimidine are suspended in 80 ml. of water, and 5 ml. of concentrated ammonia and 20 g. of Raney nickel [prepared according to Organic Synthesis 21, 15 (1941)] are added thereto. The reaction mixture is heated with stirring for ¾ hour; 2 ml. of xylene being added to prevent foaming. The reaction mixture is then filtered hot, the Raney nickel washed with hot water made alkaline with ammonia, and the filtrate acidified with acetic acid to pH 5. 5 g. of 4-sulfanilamido-5-ethyl-6-methoxy-pyrimidine of melting point 186–187° (from acetonitrile) is obtained thereby.

The 2-methylthio-4-sulfanilamido-5-ethyl-6-methoxy-pyrimidine used as starting material can be obtained as follows from its $N_4$-acetyl derivative:

24 g. of 2-methylthio - 4 - ($N_4$-acetylsulfanilamido)-5-ethyl-6-methoxy-pyrimidine are heated with 350 ml. of methanolic HCl (2.6%) for two hours under reflux. After evaporation under vacuum, the residue is stirred into a paste with water, and 3 N sodium hydroxide solution is added. The solution is treated with animal charcoal, filtered, and then neutralized with $CO_2$ gas. 17 g. of 2-methylthio - 4 - sulfanilamido - 5 - ethyl-6-methoxy-pyrimidine of melting point 210–212° crystallizes out. After recrystallization from acetonitrile the melting point is 214–215° C.

Example 4

2 g. of 2-methylthio-4-($N_4$-acetyl-sulfanilamido)-5-methyl-6-methoxy-pyrimidine are dissolved, while heating gently, in a solution of 1.5 g. of sodium carbonate and 70 ml. of water. 5–6 g. of Raney nickel are added thereto and the solution is refluxed for 2½ hours and filtered hot. By acidifying the filtrate with dilute hydrochloric acid, there are obtained 1.2 g. (65%) of 4-($N_4$-acetyl - sulfanilamido)-5-methyl-6-methoxy-pyrimidine of melting point 228–231° (from water/ethanol).

The product thus obtained is saponified on a water bath for 1½ hours with 12 ml. of 1 N sodium hydroxide solution. After cooling and filtration, the filtrate is acidified (Congo red) with dilute hydrochloric acid. The undissolved residue is filtered off. The filtrate is cautiously rendered alkaline by means of concentrated ammonia, whereupon the pH of the solution is brought to 5–7 with glacial acetic acid. .085 g. (81%) of 4-sulfanilamido-5-methyl-6-methoxy-pyrimidine of melting point 214–217° (from water/ethanol) is obtained thereby.

The 2-methylthio-4-($N_4$-acetyl-sulfanilamido)-5-methyl-6-methoxy-pyrimidine used as starting material can be obtained as follows:

1.5 g. of 2-methylthio-4-amino-5-methyl-6-methoxy-pyrimidine and 2.4 g. of p-acetamidobenzenesulfonyl chloride are dissolved in 10 ml. of absolute pyridine and allowed to stand for 24 hours at room temperature. Then, 100 ml. of water are added and the reaction product brought to crystallization. There are thus obtained 2.5 g. (80%) of 2-methylthio-4-($N_4$-acetyl-sulfanilamido)-5-methyl-6-methoxy-pyrimidine melting at 265–268° (from water/ethanol).

2 - methylthio-4-amino-5-methyl-6-methoxy-pyrimidine can in turn be prepared as follows:

(a) α-Cyano-propionic acid ethyl ester is condensed with thiourea, in the presence of sodium ethylate, to form 2-thio-4-amino-5-methyl-6-hydroxy-pyrimidine;

(b) The sodium salt of the above product is methylated with dimethyl sulfate to form 2-methylthio-4-amino-5-methyl-6-hydroxy-pyrimidine of M.P. 230° (from water/ethanol); and (c) The sodium salt of the product thus obtained is methylated with phenyl trimethylammonium chloride in the presence of dimethyl formamide to form 2-methylthio - 4 - amino - 5-methyl-6-methoxy-pyrimidine of M.P. 116–119° (from water).

Example 5

1.3 g. of 2-methylthio-4-($N_4$-acetyl-sulfanilamido)-5,6-dimethoxy-pyrimidine are dissolved in 25 ml. of water and 0.4 g. of anhydrous sodium carbonate, then refluxed for 3½ hours in the presence of 6–7 g. of Raney nickel. Then, a solution of 1 g. of sodium hydroxide in 3 ml. of water is added thereto and heating continued for another hour. The catalyst is filtered off and the filtrate acidified to Congo red with hydrochloric acid. The pH is then brought to 5 by means of ammonia, thus causing crystallization. There is thus obtained 0.51 g. of 4-sulfanilamido-5,6-dimethoxy-pyrimidine of M.P. 190–194° (from 50% ethanol).

The 2-methylthio - 4 - ($N_4$-acetyl-sulfanilamido)-5,6-dimethoxy-pyrimidine used as starting material can be prepared as follows:

0.9 g. of 2-methylthio-4-amino-5,6-dimethoxy-pyrimidine are dissolved in 3 ml. of absolute pyridine. At 0°, 1.2 g. of p-acetylamidobenzenesulfonyl chloride are added thereto and the mixture is shaken until all the material is dissolved. The solution is allowed to stand for 22 hours at 0° and the pyridine eliminated in vacuo at 20°. To the resulting product are added 20 ml. of water and 3 ml. of glacial acetic acid, whereupon the whole mixture is heated to the boil, thus causing crystallization. The crude product obtained is dissolved in 40 ml. of 2.5% soda solution, and the solution obtained is filtered and oversaturated with gaseous carbon dioxide. There is thus obtained 1.5 g. (85%) of 2-methylthio-4-($N_4$-acetyl-sulfanilamido)-5,6-dimethoxy-pyrimidine of M.P. 220–221° (from 50% ethanol).

2-methylthio-4-amino-5,6-dimethyl-pyrimidine can in turn be prepared as follows:

(a) α-Methoxy-cyanoacetic acid methyl ester is condensed with thiourea, in the presence of sodium methylate, to form 2-thio-4-amino-5-methoxy-6-hydroxy-pyrimidine, (b) The product thus obtained is methylated in a sodium methylate solution with methyl iodide to form 2-methylthio-4-amino-5-methoxy-6-hydroxy-pyrimidine of M.P. 203° (from water), and (c) The latter product is methylated with phenyltrimethylammonium-toluenesulfonate to form 2-methylthio-4-amino-5,6-dimethoxy-pyrimidine of M.P. 112–115° (from 20% methanol).

We claim:

1. A process for the preparation of a sulfanilamide of the formula

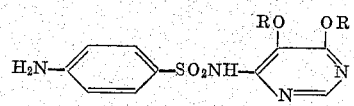

wherein R is lower alkyl comprising the step of hydrogenating a compound of the formula

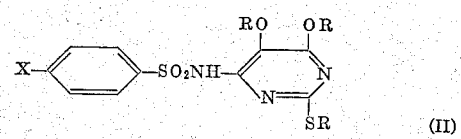

wherein R has the meaning given above and X is selected from the group consisting of amino, loweralkanoylamino, lower carbalkoxyamino, carbobenzyloxyamino, and nitro
in the presence of Raney nickel in an alkaline solution to split off the —SR group; and where X is other than amino, converting X into an amino group.

2. A process according to claim 1 wherein the compound of Formula II is selected from the group consisting of 2-methylthio-4-sulfanilamido-5,6-dimethoxy-pyrimidine and 2-methylthio-4-($N_4$-acetyl-sulfanilamido)-5,6-dimethoxy-pyrimidine.

References Cited in the file of this patent

UNITED STATES PATENTS 2,430,439   Winnek et al. _____ Nov. 4, 1947

FOREIGN PATENTS 866,843   Great Britain _____ May 3, 1961

OTHER REFERENCES

Beaman: J. Am. Chem. Soc., vol. 76, pp. 5633–5636, 1954.

Kharasch: Organic Sulfur Compounds, vol. 1, pp. 519-521.

Budesinsky et al.: Experimentia, vol. 17, No. 3, 129-130, 1961.

Bretschneider et al.: Manatsh Chem., vol. 92, No. 1, pp. 75–78, 1961.